United States Patent
Komano et al.

(10) Patent No.: US 10,360,018 B2
(45) Date of Patent: Jul. 23, 2019

(54) UPDATE CONTROL APPARATUS, SOFTWARE UPDATE SYSTEM, AND UPDATE CONTROL METHOD

(71) Applicant: Kabushiki Kaisha Toshiba, Minato-ku (JP)

(72) Inventors: Yuichi Komano, Yokohama (JP); Zhengfan Xia, Kawasaki (JP); Takeshi Kawabata, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/896,312

(22) Filed: Feb. 14, 2018

(65) Prior Publication Data

US 2019/0056925 A1 Feb. 21, 2019

(30) Foreign Application Priority Data

Aug. 21, 2017 (JP) .................................. 2017-158806

(51) Int. Cl.
*G06F 9/44* (2018.01)
*G06F 8/65* (2018.01)
(Continued)

(52) U.S. Cl.
CPC .............. *G06F 8/65* (2013.01); *H04L 9/0819* (2013.01); *H04L 41/082* (2013.01);
(Continued)

(58) Field of Classification Search
CPC ......... G06F 8/65; H04L 9/0819; H04L 67/12; H04L 67/34; H04L 41/082; H04L 41/0866; H04L 2012/40273; H04W 4/48
(Continued)

(56) References Cited

U.S. PATENT DOCUMENTS 7,623,853 B2 * 11/2009 Vikse ................ H04M 3/42178
455/410
7,899,558 B2 * 3/2011 Kuhls ....................... G06F 8/65
700/11
(Continued)

FOREIGN PATENT DOCUMENTS

JP 2017-059210 3/2017
JP 2019-36238 A 3/2019

OTHER PUBLICATIONS

Nilsson et al., "A Framework for Self-Verification of Firmware Updates over the Air in Vehicle ECUs", 2008, IEEE, 5 pages (Year: 2008).*

(Continued)

*Primary Examiner* — Ted T. Vo
(74) *Attorney, Agent, or Firm* — Oblon, McClelland, Maier & Neustadt, L.L.P.

(57) ABSTRACT

According to an embodiment, an update control apparatus is to control update of software in a terminal connected to a network. The update control apparatus includes a first communication circuit, a second communication circuit, and a processor. The first communication circuit is configured to communicate with a server located outside the network. The second communication circuit is configured to communicate with the terminal through the network. The processor is configured to: receive update data to update the software from the server using the first communication circuit; transmit the update data to the terminal, as well as receive an update result indicating whether update of the software has succeeded, together with verification data, from the terminal using the second communication circuit; and verify, using the verification data, whether the update result is proper data.

11 Claims, 6 Drawing Sheets

(51) Int. Cl.
*H04L 29/08* (2006.01)
*H04L 9/08* (2006.01)
*H04W 4/48* (2018.01)
*H04L 12/24* (2006.01)
*H04L 12/40* (2006.01)

(52) U.S. Cl.
CPC .......... *H04L 41/0866* (2013.01); *H04L 67/12* (2013.01); *H04L 67/34* (2013.01); *H04W 4/48* (2018.02); *H04L 2012/40273* (2013.01)

(58) Field of Classification Search
USPC ................................................. 717/168–178
See application file for complete search history.

(56) References Cited

U.S. PATENT DOCUMENTS

| | | | |
|---|---|---|---|
| 9,641,329 B2* | 5/2017 | Takahashi | ............. H04L 9/0894 |
| 2017/0060559 A1 | 3/2017 | Ye et al. | |
| 2017/0139778 A1 | 5/2017 | Kito et al. | |
| 2017/0192770 A1 | 7/2017 | Ujiie et al. | |
| 2019/0057214 A1 | 2/2019 | Xia et al. | |

OTHER PUBLICATIONS

Nilsson et al., "Secure Firmware Updates over the Air in Intelligent Vehicles", 2008, IEEE, pp. 380-384 (Year: 2008).*

Daimi et al., "Securing Vehicle ECUs Update Over the Air", 2016, AICT 2016 : The Twelfth Advanced International Conference on Telecommunications, pp. 45-50 (Year: 2016).*

* cited by examiner

UPDATE CONTROL APPARATUS, SOFTWARE UPDATE SYSTEM, AND UPDATE CONTROL METHOD

CROSS-REFERENCE TO RELATED APPLICATIONS

This application is based upon and claims the benefit of priority from Japanese Patent Application No. 2017-158806, filed on Aug. 21, 2017; the entire contents of which are incorporated herein by reference.

FIELD

Embodiments described herein relate generally to an update control apparatus, an update control system, and an update control method.

BACKGROUND

For example, in in-vehicle networks mounted on automobiles, a number of terminals, such as electronic control units (ECU), are connected through a network bus of a standard, such as controller area network (CAN) and FlexRay (registered trademark). Each of the terminals, such as ECUs, holds firmware inside, and operates by executing the processing described in the firmware. The firmware stored in the terminal is updated, to expand the function of the terminal, and take countermeasures against newly found vulnerability. In the case of updating software, such as the firmware in the terminal, on a network on which the security measure is not entirely perfect, as in in-vehicle networks, it is desired to guarantee proper update of software.

DETAILED DESCRIPTION

According to an embodiment, an update control apparatus is to control update of software in a terminal connected to a network. The update control apparatus includes a first communication circuit, a second communication circuit, and a processor. The first communication circuit is configured to communicate with a server located outside the network. The second communication circuit is configured to communicate with the terminal through the network. The processor is configured to: receive update data to update the software from the server using the first communication circuit; transmit the update data to the terminal using the second communication circuit; receive an update result indicating whether update of the software has succeeded, together with verification data, from the terminal using the second communication circuit; and verify, using the verification data, whether the update result is proper data.

The following is a detailed explanation of an update control apparatus, a software update system, and an update control method according to an embodiment, with reference to drawings. For example, the software update system according to an embodiment is effectively applicable for the purpose of updating firmware (an example of "software") of an ECU connected as a terminal to an in-vehicle network, in an in-vehicle network system mounted on the automobile. In this case, for example, an in-vehicle gateway apparatus connected to the in-vehicle network can be provided with a function as the update control apparatus of the embodiment. The following explanation illustrates an example in which the software update system is applied to such an in-vehicle network system, but the system to which the update system is applicable is not limited thereto.

First Embodiment

Figure 1:
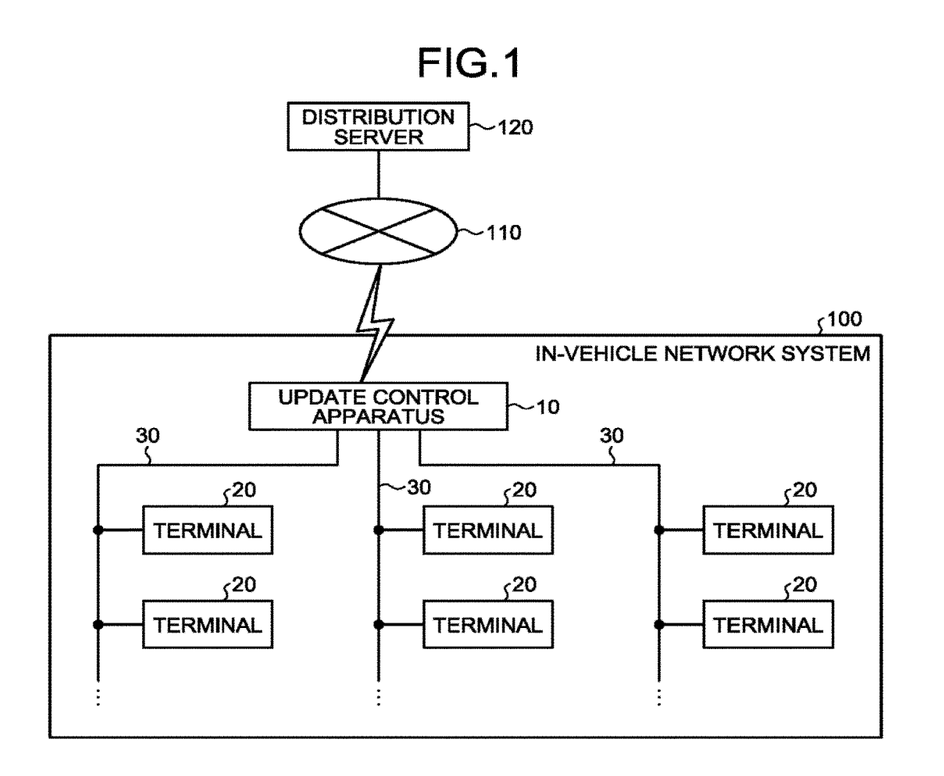
FIG. 1 is a block diagram illustrating a schematic configuration of a software update system according to an embodiment.

FIG. 1 is a block diagram illustrating a schematic configuration of the software update system according to the present embodiment. For example, the software update system according to the present embodiment is configured as an in-vehicle network system 100 capable of communicating with a distribution server 120 through an external network 110, such as the Internet, as illustrated in FIG. 1.

The in-vehicle network system 100 has a structure in which an update control apparatus 10 and a plurality of terminals 20 are connected through a network bus 30. The update control apparatus 10 has a function of communicating with each of the terminals 20 through the network bus 30, and a function of connecting to the external network 110, such as the Internet, using a mobile communication network, such as 3rd Generation Partnership Project (3GPP: registered trademark) and Long Terra Evolution (LTE: registered trademark), or wireless communication, such as Wi-Fi (registered trademark) and Bluetooth (registered trademark), and communicating with the distribution server 120 through the external network 110. The function of connecting to the external network 110 is not always included in the update control apparatus 10, but the update control apparatus 10 may be configured to connect to the external network 110 using an external communication apparatus separate from the update control apparatus 10.

The distribution server 120 is a server providing update data to update firmware stored in the terminals 20 of the in-vehicle network system 100. The update control apparatus 10 receives the update data from the distribution server 120 through the external network 110, and transmits the received update data to the terminal 20 being a target of firmware update, through the network bus 30. Communications performed between the update control apparatus 10 of the in-vehicle network system 100 and the distribution server 120 through the external network 110 is properly protected by, for example, a technique, such as encryption, digital signature, and message authentication.

The terminal 20 performs processing to update the firmware stored therein, using the update data received from the update control apparatus 10 through the network bus 30. The terminal 20 transmits an update result indicating whether update of the firmware has succeeded, together with verification data, to the update control apparatus 10 through the network bus 30. The verification data is used in the update control apparatus 10 to verify whether the update result received from the terminal 20 is proper data. The details of a specific example of the verification data will be described later.

Figure 2:
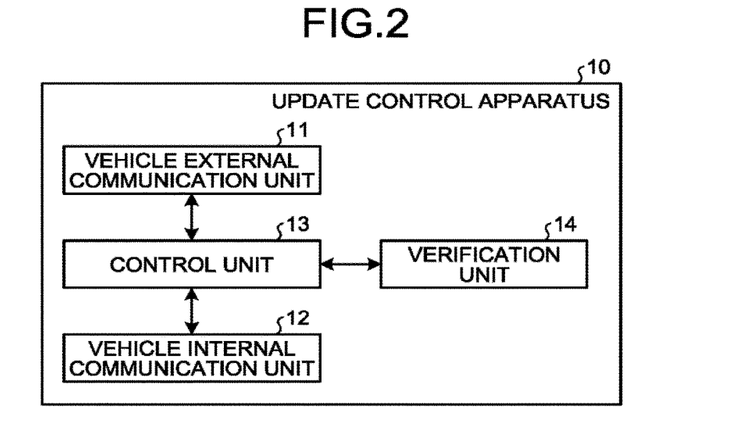
FIG. 2 is a block diagram illustrating a functional configuration example of an update control apparatus.

FIG. 2 is a block diagram illustrating a functional configuration example of the update control apparatus 10. For example, as illustrated in FIG. 2, the update control apparatus 10 includes a vehicle external communication unit 11 (first communication unit), a vehicle internal communication unit 12 (second communication unit), a control unit 13, and a verification unit 14, as functional constituent elements.

The vehicle external communication unit 11 functions to communicate with the distribution server 120 through the external network 110. The vehicle internal communication unit 12 functions to communicate with each of the terminals 20 connected to the network bus 30, through the network bus 30 of the in-vehicle network system 100.

The control unit 13 receives update data from the distribution server 120 using the vehicle external communication unit 11. The control unit 13 transmits the update data received from the distribution server 120 to the terminal 20 using the vehicle internal communication unit 12, and receives the update result described above from the terminal 20 together with the verification data. The update result and the verification data received by the control unit 13 from the terminal 20 are transferred to the verification unit 14.

The verification unit 14 verifies, using the verification data received from the control unit 13, whether the update result received from the terminal 20 together with the verification data is proper data. Examples of the verification data include a message authentication code (MAC) generated by the terminal 20 on the basis of the update result using a secret key (shared key) shared with the update control apparatus 10, and a digital signature generated by the terminal 20 on the basis of the update result using a secret key, and verifiable with the update control apparatus 10 using a public key of the terminal 20.

In the case of using a message authentication code as the verification data, the terminal 20 inputs the update result and a secret key (shared key) stored in advance to a MAC algorithm, to generate a message authentication code (an example of "first data"). Thereafter, the terminal 20 transmits the message authentication code in addition to the update result, to the update control apparatus 10. The verification unit 14 of the update control apparatus 10 inputs the update result received from the terminal 20 and the secret key (shared key) stored in advance to the MAC algorithm, to generate a message authentication code (an example of "third data"). The verification unit 14 verifies whether the update result received from the terminal 20 is proper data, on the basis of whether the message authentication code (an example of "first data") received from the terminal 20 agrees with the message authentication code (an example of "third data") generated by itself.

In the case of using a digital signature as the verification data, the terminal 20 inputs the update result to a predetermined hash function to generate a hash value, and generates digital signature (an example of "first data") using the hash value and the secret key. Thereafter, the terminal 20 transmits the digital signature in addition to the update result, to the update control apparatus 10. The verification unit 14 of the update control apparatus 10 inputs the update result received from the terminal 20 to the predetermined hash function shared with the terminal 20 to generate a hash value (an example of "second data"), and generates a hash value (an example of "third data") using the digital signature received from the terminal 20 and a public key corresponding to the secret key of the terminal 20. The verification unit 14 verifies whether the update result received from the terminal 20 is proper data, on the basis of whether the hash value (an example of "second data") generated from the update result agrees with the hash value (an example of "third data") generated from the digital signature.

A result of verification of the update result with the verification unit 14 is transferred to the control unit 13. When the control unit 13 receives a verification result indicating that the update result is not proper data from the verification unit 14, that is, when the verification unit 14 determines that the update result transmitted from the terminal 20 is not proper data, the control unit 13 may execute update of firmware in the terminal 20 again, or execute restoration of the firmware in the terminal 20 or a plurality of terminals 20. When update of the firmware is executed again, the control unit 13 retransmits update data received from the distribution server 120 to the terminal 20 using the vehicle internal communication unit 12. When restoration of the firmware is executed, the control unit 13 transmits restoration data to restore the firmware before update to the terminal 20 using the vehicle internal communication unit 12.

The control unit 13 may control the state of the automobile on which the in-vehicle network system 100 is mounted, in accordance with success/failure of update and/or restoration of the firmware in the terminal 20. For example, when update of the firmware in the terminal 20 is executed, the control unit 13 may perform control to change the state of the automobile to "firmware update mode" first, return the state of the automobile to "travelling possible mode" when update and/or restoration of the firmware in the terminal 20 succeeds, and change the state of the automobile to "abnormal mode" when update and/or restoration of the firmware in the terminal 20 ends in failure.

Figure 3:
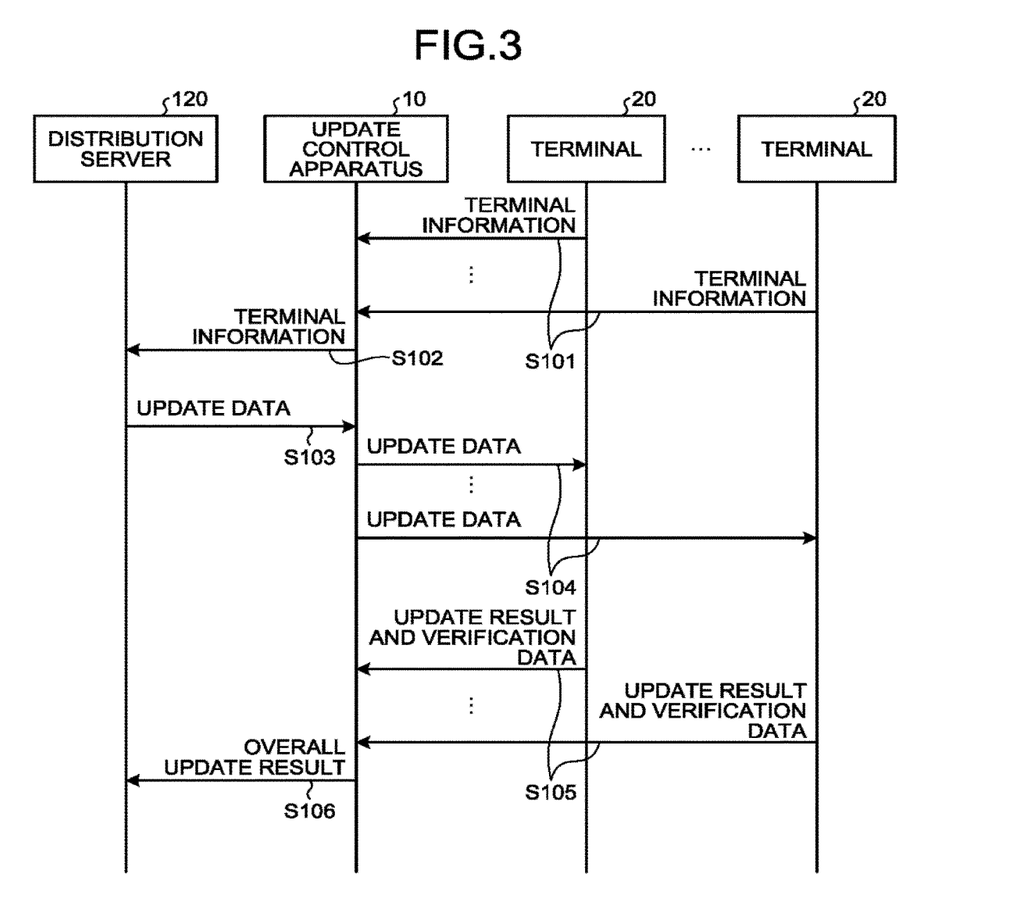
FIG. 3 is a sequence diagram illustrating an outline of operations in a first embodiment.

The following is an explanation of operations of the software update system according to the present embodiment, with reference to FIG. 3. FIG. 3 is a sequence diagram illustrating an outline of operations of the present embodiment. FIG. 3 illustrates only two of the terminals 20 included in the in-vehicle network system 100, and illustration of the other terminals 20 is omitted.

First, each of the terminals 20 included in the in-vehicle network system 100 transmits terminal information including the identifier (ID) of the terminal 20 and the version of the firmware stored in the terminal 20 to the update control apparatus 10 (Step S101). The processing may be omitted, when the distribution server 120 or the update control apparatus 10 stores the terminal information of the terminals 20 included in the in-vehicle network system 100.

When the update control apparatus 10 receives terminal information from each of the terminals 20, the update control apparatus 10 transmits the pieces of terminal information to the distribution server 120, and inquires whether update data to update the firmware exists (Step S102). The processing may be omitted, when the distribution server 120 stores the terminal information of the terminals 20 included in the in-vehicle network system 100.

The distribution server 120 checks whether the update data exists, on the basis of the terminal information. When update data corresponding to at least one of the terminals 20 exists, the distribution server 120 transmits the update data to the update control apparatus 10 (Step S103). The update data includes the latest firmware or compressed data thereof, or data of difference (patch) between the firmware stored in the terminal 20 and the firmware to be stored after update. The update data may include firmware verification information to check whether the updated firmware is developed by a proper vendor. The firmware verification information may be, for example, a hash value of the updated firmware, a message authentication code for the updated firmware calculated using a secret key shared in advance between the vendor and the terminal 20, or a digital signature for the updated firmware calculated using a secret key of the vendor.

The distribution server 120 may transmit an ID of the terminal 20 to be updated and the like to the update control apparatus 10, together with the update data. When a plurality of pieces of update data corresponding to a plurality of terminals 20 exist, the distribution server 120 may transmit update control information described later to the update control apparatus 10, together with these pieces of update data. As another example, the distribution server 120 may transmit restoration data to restore the original firmware (firmware before update) when any abnormality occurs in update of the firmware to the update control apparatus 10, together with the update data.

When the update control apparatus 10 receives update data from the distribution server 120, the update control apparatus 10 stores the update data in a storage area in the in-vehicle network system 100. The storage area may be secured in the update control apparatus 10, or in a storage device connected with the update control apparatus 10 through the network bus 30. When the update control apparatus 10 receives the ID of the terminal 20 to be updated, the update control information, the restoration data and/or the like together with the update data from the distribution server 120, the update control apparatus 10 may store these pieces of information in the storage area, together with the update data.

After the update control apparatus 10 receives the update data from the distribution server 120, the update control apparatus 10 changes the state of the automobile equipped with the in-vehicle network system 100 to the "firmware update mode". The automobile may be controlled to be prevented from traveling when the automobile is in the "firmware update mode", or may be controlled to be enabled to travel, with some functions restricted.

When the update control apparatus 10 receives a plurality of pieces of update data without receiving update control information from the distribution server 120, the update control apparatus 10 generates update control information, on the basis of dependence relation between the terminals 20 to which the pieces of update information are applied. The update control information is information to perform control such that firmware updates of the terminals 20 that operate in cooperation are linked.

The following is an explanation of an example of the update control information and an update process corresponding to the update control information. Suppose that the terminal A and the terminal C are terminals operating in cooperation, among the terminals 20 being targets for update of the firmware. At this time, when only one of the terminal A and the terminal C is subjected to firmware update, there is the possibility that the operations in cooperation are not guaranteed. For this reason, the update control apparatus 10 is required to check that the firmware has been updated in both the terminal A and the terminal C. When firmware update of one of the terminal A and the terminal C cannot be verified, the update control apparatus 10 may restore the firmware in the other terminal, to return the state to the state before firmware update is executed.

Suppose that the firmware in the terminal F operating independently of the terminal A and the terminal C is also updated, in addition to the terminal A and the terminal C operating in cooperation. At this time, the update control information includes information indicating that the terminal A and the terminal C form a pair. For example, the update control information is [(a, c), f]. The information "(a, c)" indicates that the terminal A and the terminal C form a pair, and the pieces of firmware in all of them are to be updated, or the pieces of the firmware in none of them are to be updated (when only part of them is updated, the updated one is to be restored to the original). The information "," indicates that updates of the terminals before and after the mark "," may be performed in any order. As another example, the update control information is [(a, c)→f]. The information "→" indicates that the update processing just after the mark "→" is to be executed, after the update processing just before the mark "→" is finished.

With reference to FIG. 3 again, the update control apparatus 10 transmits the update data to the terminal 20 (terminal 20 in which the latest firmware exists) as a target of firmware update, to instruct the terminal 20 to update the firmware (Step S104). When two or more terminals 20 are targets, the update control apparatus 10 instructs each of the terminals 20 to update the firmware, on the basis of the update control information.

Each of the terminals 20 that have received the update data from the update control apparatus 10 performs processing to update the firmware stored in itself using the update data, and transmits an update result indicating whether the update of the firmware has succeeded to the update control apparatus 10. At this time, each of the terminals 20 generates verification data to verify in the update control apparatus 10 whether the update result is proper data, and transmits the verification data to the update control apparatus 10, together with the update result (Step S105). When the firmware is updated, each of the terminals 20 may use the firmware verification information, to check whether the updated firmware to be newly stored is proper.

When the update control apparatus 10 receives the update result and the verification data from the terminal 20, the update control apparatus 10 verifies whether the update result is proper data using the verification data. When the update control apparatus 10 confirms that the update result is proper data for all the terminals 20 that transmitted the update data, the update control apparatus 10 thereafter checks whether the firmware has been updated in all the terminals 20. When the firmware has been updated in all the terminals 20, the update control apparatus 10 transmits an overall update result indicating that the firmware in each of the terminals 20 has been updated, to the distribution server 120 (Step S106). Thereafter, the update control apparatus 10 changes the state of the automobile to the "traveling possible mode".

By contrast, when any improper update result exists, the update control apparatus 10 may execute the firmware update of the terminal 20 again, or execute restoration of the firmware in the terminal 20, or a plurality of terminals 20 including other terminals 20 performing operations in cooperation with the terminal 20, as described later. Thereafter, the update control apparatus 10 may change the state of the automobile to the "traveling possible mode" or the "abnormal mode", in accordance with success/failure of the update and/or restoration of the firmware. The "abnormal mode" is a mode indicating that update of the firmware has ended in failure, and promoting the owner of the automobile to have the automobile inspected at the dealer. In the "abnormal mode", the automobile may be controlled to be prevented from traveling, or controlled to be enabled to travel, with some functions restricted. In this state, the update control apparatus 10 may transmit an overall update result indicating that some or all of the pieces of update data has not been applied, to the distribution server 120.

When the terminal 20 has failed to update the firmware, the update control apparatus 10 may execute the update of the firmware in the terminal 20 again, or try to restore the firmware. When the firmware can be built with only the update data, the update control apparatus 10 may retransmit the update data to the terminal 20 that has failed to update the firmware, to execute the update again. As another example, when the update data includes only a difference from the firmware of the previous version and the firmware cannot be built with only the update data, the update control apparatus 10 may restore the firmware in the terminal 20 using the restoration data, and thereafter retransmit the update data to the terminal 20. As another example, the update control apparatus 10 may request the distribution server 120 to transmit new update data enabling new firmware to be built, and transfer the new update data to the terminal 20.

The restoration data is data enabling the firmware of the previous version to be built. The restoration data may be requested by the update control apparatus 10 from the distribution server 120 as required, transmitted from the distribution server 120 to the update control apparatus 10 together with the update data, or transmitted from the distribution server 120 to the update control apparatus 10 at a timing different from the firmware update. The restoration data may be data enabling the firmware of the previous version to be built alone, or data including only a difference from the firmware of the new version, and not enabling the firmware of the old version to be built alone but enabling the version of the firmware to be returned from the new version to the old version.

Figure 4:
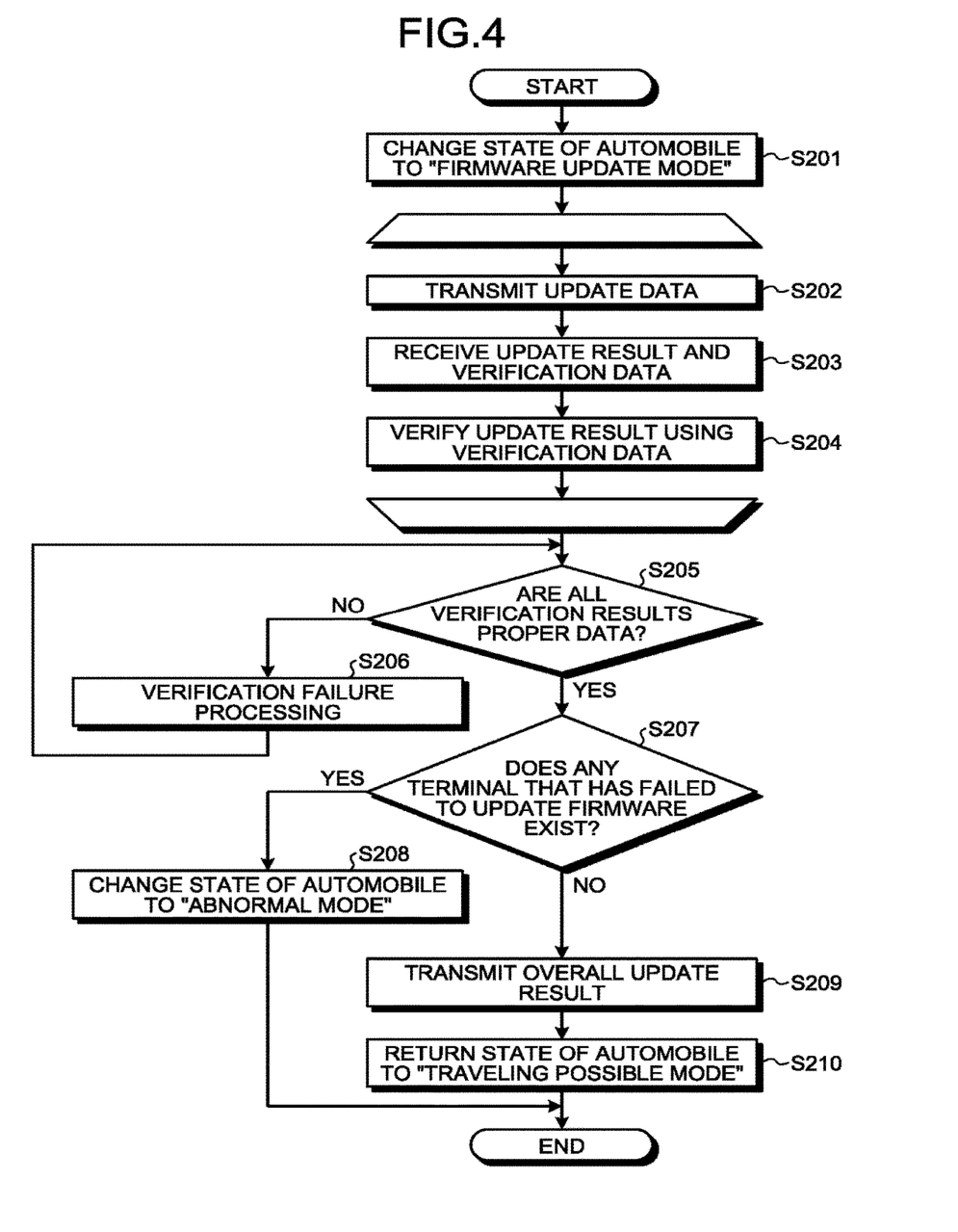
FIG. 4 is a flowchart illustrating an example of a process of the update control apparatus.

The following is an explanation of a process executed with the update control apparatus 10 after update data is received from the distribution server 120, with reference to FIG. 4. FIG. 4 is a flowchart illustrating an example of a process executed with the update control apparatus 10.

When the update control apparatus 10 receives update data from the distribution server 120, first, the update control apparatus 10 changes the state of the automobile from the "traveling possible state" to the "firmware update mode" (Step S201). Thereafter, the update control apparatus 10 transmits the update data received from the distribution server 120 to the terminal 20 being a target of firmware update (Step S202). Thereafter, the update control apparatus 10 receives an update result and verification data from the terminal 20 to which the update data has been transmitted (Step S203), and verifies whether the update result is proper data using the received verification data (Step S204). The processing from Step S202 to Step S204 is processing performed repeatedly for each of the terminals 20 being targets of firmware update.

When verification of the update result is finished for all the terminals 20 to which the update data have been transmitted, the update control apparatus 10 checks whether all the update results are proper (Step S205). When any update result determined as improper data exists (No at Step S205), the update control apparatus 10 performs verification failure processing on the terminal 20 recognized as the transmission source of the update result (Step S206). The verification failure processing is, for example, re-execution of the firmware update, or restoration of the firmware. When the firmware update is executed again, the verification failure processing also includes processing of receiving the update result and the verification data again from the terminal 20, and performing verification of the update result using the verification data.

By contrast, when it is confirmed that all the update results are proper (Yes at Step S205), the update control apparatus 10 checks whether any terminal 20 that has failed to update the firmware exists (Step S207). When any terminal 20 that has failed to update the firmware exists (Yes at Step. S207), the update control apparatus 10 changes the state of the automobile to the "abnormal mode" (Step S208), and ends the process. By contrast, when all the terminals 20 have succeeded in updating the firmware (No at Step S207), the update control apparatus 10 transmits an overall update result indicating that the firmware in each of the terminals 20 has been updated to the distribution server 120 (Step S209), returns the state of the automobile to the "travelling possible mode" (Step S210), and ends the process.

When any terminal 20 that has failed to update the firmware exists (Yes at Step S207), the update control apparatus 10 may execute update failure processing. The update failure processing is, for example, re-execution of the firmware update, or restoration of the firmware, like the verification failure processing as described above. When the firmware cannot be updated or the firmware cannot be restored even when the update failure processing is executed, the update control apparatus 10 may change the state of the automobile to the "abnormal mode" (Step S208), and end the process. As another example, when any terminal 20 that cannot update the firmware exists, the update control apparatus 10 may transmit an overall update result indicating that some or all of pieces of update data has not been applied, to the distribution server 120.

As described above in detail with specific examples, in the present embodiment, the update control apparatus 10 verifies whether the update result is proper data, using the verification data received from the terminal 20, and thus the firmware (software) has been updated properly can be guaranteed.

Specifically, when the update result received by the update control apparatus 10 from the terminal 20 is data transmitted improperly by falsification or spoofing, the update control apparatus 10 erroneously recognizes that the firmware in the terminal 20 has been updated, even though actually the firmware in the terminal 20 has not been updated. In such a case, proper update of the functions of the terminal 20, or measures against vulnerability of the terminal 20 is not properly performed, or operations in cooperation between the terminals 20 cannot be realized. By contrast, in the present embodiment, the update control apparatus 10 receives verification data from the terminal 20 together with the update result, and verifies whether the update result is proper data using the verification data. Therefore, erroneous recognition that the firmware has been updated based on the update result, improperly transmitted by falsification or spoofing can be effectively prevented, and proper update of the firmware has been updated properly can be guaranteed.

Second Embodiment

The first embodiment described above enables verification as to whether the update result received by the update control apparatus 10 from the terminal 20 is proper data, but the update control apparatus 10 is not always capable of verifying whether the firmware in the terminal 20 has been securely updated to the latest firmware as developed by the vendor. In addition, when the terminal 20 has no calculation resources enough to generate a digital signature, and the update control apparatus 10 and the terminal 20 are not capable of sharing an unique secret key to perform message authentication, the update control apparatus 10 cannot verify that the firmware in the terminal 20 has been surely updated to the latest firmware.

In the present embodiment, the vendor participates in verification of the update result in the update control apparatus 10, to enable the update control apparatus 10 to verify that the firmware in each of the terminals 20 has been surely updated to the latest firmware developed by the vendor. The following explanation illustrates only a part different from the first embodiment, and explanation overlapping the first embodiment will be omitted as appropriate.

The distribution server 120 acquires and stores update data to update the firmware stored in the terminal 20 in the in-vehicle network system 100 to the latest firmware, from the vendor that develops the terminal 20 and the firmware stored in the terminal 20. In the present embodiment, the distribution server 120 acquires and stores reference data from the vendor, together with the update data. The reference data is data generated using a secret key shared in advance between the vendor that develops the firmware and the terminal 20. For example, the reference data is a message authentication code of the latest firmware calculated using the secret key.

When the distribution server 120 of the present embodiment transmits update data to the update control apparatus 10, the distribution server 120 transmits reference data (an example of "fourth data") together with the update data. When the update control apparatus 10 receives update data from the distribution server 120, the update control apparatus 10 also receives reference data. When the update control apparatus 10 receives the update result and the verification data from the terminal 20, the update control apparatus 10 verifies, using the reference data received from the distribution server 120 and the verification data received from the terminal 20, whether the update result received from the terminal 20 is proper data.

In the present embodiment, the verification data received by the update control apparatus 10 from the terminal 20 is data generated using a secret key shared between the terminal 20 and the vendor. For example, the verification data is a message authentication code of the updated firmware. The message authentication code is calculated using the secret key. Specifically, after the terminal 20 updates the firmware stored therein using the update data received from the update control apparatus 10, the terminal 20 generates a message authentication code (an example of "sixth data") on the basis of the updated firmware using the secret key shared with the vendor, and transmits the message authentication code as the verification data in addition to the update result, to the update control apparatus 10.

The verification unit 14 of the update control apparatus 10 verifies whether the update result received from the terminal 20 is proper data, on the basis of whether the message authentication code (an example of "sixth data") of the updated firmware received from the terminal 20 agrees with the reference data (an example of "fourth data") received from the distribution server 120.

Figure 5:
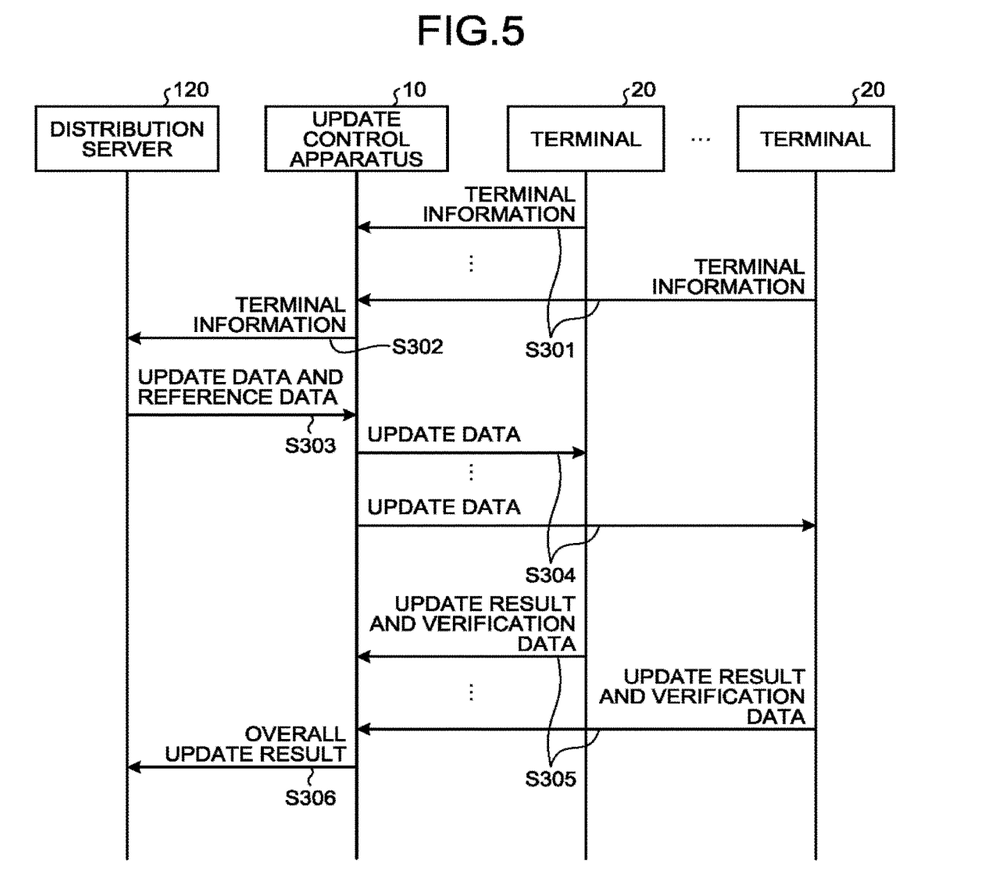
FIG. 5 is a sequence diagram illustrating an outline of operations in a second embodiment.

FIG. 5 is a sequence diagram illustrating an outline of operations of the present embodiment. The following is an explanation of operations of the software update system according to the present embodiment, with reference to FIG. 5.

Transmission (Step S301 and Step S302) of the terminal information is similar to that in the first embodiment described above, and explanation thereof is omitted.

The distribution server 120 checks whether update data exists, on the basis of the terminal information. When any update data corresponding to at least one of the terminals 20 exists, the distribution server 120 transmits the update data to the update control apparatus 10 (Step S303). In the present embodiment, the distribution server 120 transmits reference data to the update control apparatus 10, together with the update data. The reference data is, for example, a message authentication code of the updated firmware calculated using a secret key shared in advance between the vendor and the terminal 20. As another example, the distribution server 120 may also transmit an ID of the terminal 20 being an update target, the update control information, and restoration data to the update control apparatus 10, together with the update data, in the same manner as the first embodiment.

When the update control apparatus 10 receives update data and reference data from the distribution server 120, the update control apparatus 10 stores the update data and the reference data in a storage area in the in-vehicle network system 100.

After the update control apparatus 10 receives the update data from the distribution server 120, the update control apparatus 10 changes the state of the automobile equipped with the in-vehicle network system 100 to the "firmware update mode", in the same manner as the first embodiment. The update control apparatus 10 generates update control information, if necessary, and transmits the update data to each terminal 20, on the basis of the update control information, to instruct the terminal 20 to update the firmware (Step S304). However, the update control apparatus 10 does not transmit the reference data to the terminals 20.

Each of the terminals 20 that has received the update data from the update control apparatus 10 updates the firmware stored therein using the update data, and transmits an update result to the update control apparatus 10. At this time, each of the terminals 20 generates, for example, a message authentication code of the updated firmware using a secret key shared in advance with the vendor, and transmits the message authentication code as verification data in addition to the update result, to the update control apparatus 10 (Step S305).

When the update control apparatus 10 receives the update result and verification data from the terminal 20, the update control apparatus 10 verifies whether the update result received from the terminal 20 is proper data, on the basis of whether the verification data received from the terminal 20 agrees with the reference data received from the distribution server 120. Thereafter, the update control apparatus 10 recognizes the states of firmware updates in the respective terminals 20, on the basis of the update result verified as proper data, and transmits the overall update result to the distribution server 120 (Step S306), changes the state of the automobile to the "traveling possible mode" or "abnormal mode", and/or performs other operation in accordance with the states. These are the same as those in the first embodiment, and detailed explanation thereof is omitted.

As described above, in the present embodiment, whether the update result is proper data is verified on the basis of whether the reference data generated using a secret key shared in advance between the vendor and the terminal 20 agrees with the verification data generated by the terminal 20 using the secret key shared with the vendor. Therefore, the update control apparatus 10 can confirm that the firmware in each terminal 20 has been surely updated to the latest firmware developed by the vendor. In particular, in the first embodiment, when the terminal 20 has no calculation resources enough to generate a digital signature, or the update control apparatus 10 and the terminal 20 are not capable of sharing an unique secret key to perform message authentication, the vendor participates in verification, to enable the update control apparatus 10 to confirm that the firmware in each of the terminals 20 has been surely updated to the latest firmware developed by the vendor.

Modification

In the second embodiment described above, the reference data and the verification data have the same value. In this case, the update control apparatus 10 retains the reference data. For this reason, when an improper terminal improperly reads the reference data from the update control apparatus 10 or the storage area, and transmits the reference data improperly read by impersonating the terminal 20 being a target of firmware update, to the update control apparatus 10, the improperly read data cannot be distinguished from the verification data transmitted from the terminal 20 being the target of firmware update, and the update control apparatus 10 may erroneously determine that the update result is proper data.

For this reason, in the present modification, the distribution server 120 transmits modified reference data (an example of "fifth data") generated on the basis of the reference data, instead of the reference data in the second embodiment described above, to the update control apparatus 10. The modified reference data is a value calculated from the reference data, such as a hash value of the reference data, and partial data of the reference data.

In the present modification, when the update control apparatus 10 receives verification data, such as a message authentication code of the updated firmware, from the terminal 20, the update control apparatus 10 generates modified verification data (an example of "seventh data"), on the basis of the verification data received from the terminal 20, by the same method as the method for generating modified reference data from the reference data. The verification unit 14 of the update control apparatus 10 verifies whether the update result received from the terminal 20 is proper data, on the basis of whether the generated modified verification data agrees with the modified reference data received from the distribution server 120. In this manner, the update control apparatus 10 can correctly verify whether the update result received from the terminal 20 is proper data.

In addition, the update control apparatus 10 may transmit the overall update result to the distribution server 120 while including, in the overall update result, modified verification data generated on the basis of the verification data received from the terminal 20. In this case, the distribution server 120 or the vendor can confirm that the terminal 20 has surely updated the firmware and generated the verification data, by confirming that the modified verification data received from the update control apparatus 10 agrees with the modified reference data.

Third Embodiment

In the second embodiment and the modification thereof described above, the distribution server 120 transmits reference data or modified reference data to the update control apparatus 10, together with update data. This configuration has the problem of increase in the number of terminals 20 in the automobiles, and increase in cost to transmit, store, and compare to verify the reference data or the modified reference data, in the situation in which pieces of the firmware in many terminals 20 are updated simultaneously.

For this reason, in the present embodiment, the distribution server 120 transmits integrated reference data (an example of "eighth data") generated by integrating pieces of reference data for the respective terminals 20 to the update control apparatus 10, instead of pieces of reference data or modified reference data for the respective terminals 20. The pieces of reference data for the respective terminals 20 are, for example, message authentication codes of the updated firmware. The message authentication codes are calculated using secret keys shared in advance between the vendor and the respective terminals 20. The integrated reference data is, for example, a hash value of data obtained by coupling the message authentication codes of the update firmware in the respective terminals 20.

The update control apparatus 10 of the present embodiment stores the integrated reference data received from the distribution server 120 in the storage area. When the update control apparatus 10 receives pieces of verification data, such as message authentication codes of the update firmware generated by the respective terminals 20 after the firmware is updated, from the respective terminals 20, the update control apparatus 10 integrates the pieces of verification data received from the respective terminals 20, to generate integrated verification data (an example of "ninth data"), by the same method as the method for generating the integrated reference data. The verification unit 14 of the update control apparatus 10 verifies whether the update results received from the respective terminals 20 are proper pieces of data, on the basis of whether the generated integrated verification data agrees with the integrated reference data received from the distribution server 120. By doing so, the necessity for transmitting, storing, and comparing to verify each of pieces of reference data corresponding to the respective terminals 20 is eliminated.

Comparing the integrated verification data with the integrated reference data enables determination that all the update results received from the respective terminals 20 are proper data, or at least some of the update results are improper data, but cannot enable identification of a terminal 20 corresponding to an update result that is improper data, when it is determined that some of the update results are improper data. For this reason, the distribution server 120 may transmit digest (an example of "tenth data") of the reference data for each of the terminals 20 to the update control apparatus 10, together with the integrated reference data. The digest of the reference data is, for example, a specific several bits of reference data, or a specific several bits of the hash value of the reference data. The digest with a small data size enables suppression of the cost for processing and/or storage, in comparison with the case of transmitting, storing, and comparing to verify each of pieces of reference data corresponding to the respective terminals 20.

In the case of this example, the update control apparatus 10 stores the integrated reference data and the digests received from the distribution server 120, in the storage area. When it is determined that any of the update results is improper data as a result of comparison between the integrated reference data and the integrated reference data, the update control apparatus 10 checks the verification data received from each of the terminals 20 against the corresponding digest, to identify a terminal 20 corresponding to an update result that is improper data.

The present embodiment illustrates a hash value of data obtained by coupling the message authentication codes of the updated firmware in the respective terminals 20, as an example of the integrated reference data, but the integrated reference data is not limited thereto. For example, the integrated reference data may be a message authentication code calculated by cipher based MAC (CMAC, NIST Special Publication 800-38B), by arranging the pieces of updated firmware corresponding to the respective terminals 20 in a plaintext block. In this case, a digest of an arithmetic result (value that is not output by CMAC) of each encryption processing may be used as the digest described above.

As another example, the integrated reference data may be an exclusive OR of the message authentication codes of pieces of the updated firmware corresponding to the respective terminals 20. In this case, a part of bits of the message authentication code corresponding to each terminal 20 may be used as the digest described above. In the case of calculating integrated reference data and digests from pieces of reference data of N terminals 20, due to the property of exclusive OR, the update control apparatus 10 can calculate the bits of reference data for the last one terminal 20, from the integrated reference data and the digests of the same bit positions for the N−1 terminals 20. Using the property enables efficient detection of the terminal 20 in which an error of firmware update has occurred.

Figure 6:
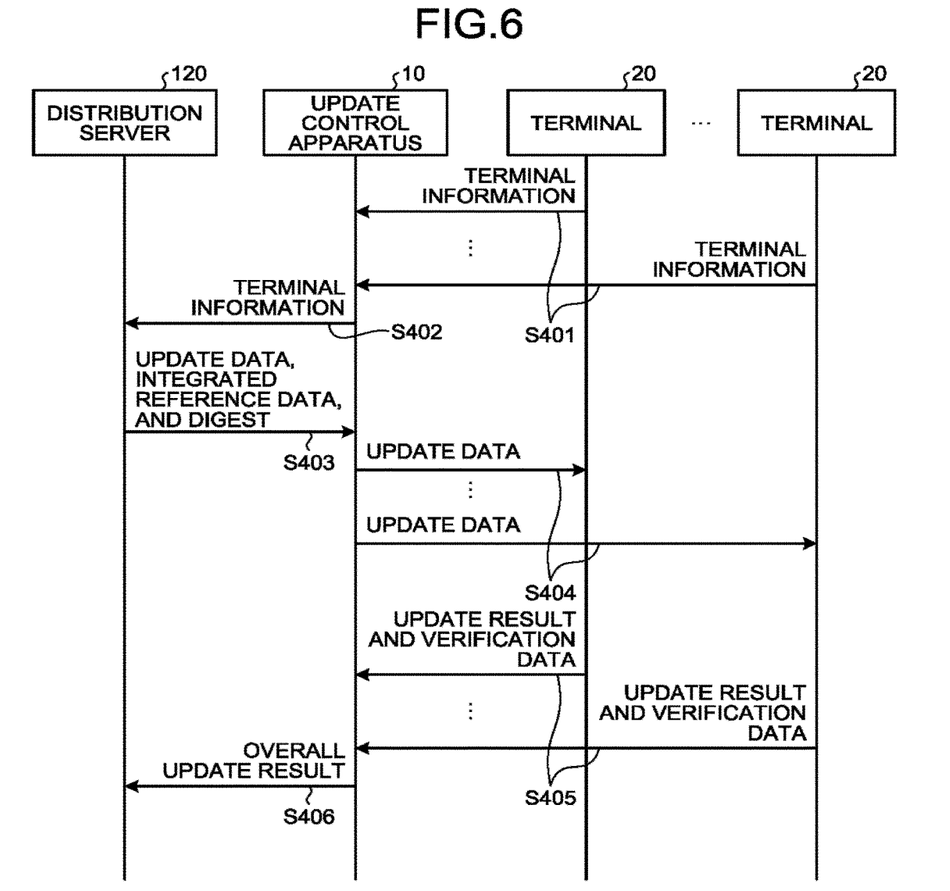
FIG. 6 is a sequence diagram illustrating an outline of operations in a third embodiment.

FIG. 6 is a sequence diagram illustrating the outline of operations of the present embodiment. The following is an explanation of operations of the software update system according to the present embodiment, with reference to FIG. 6.

Transmission (Step S401 and Step S402) of the terminal information is the same as that in the first embodiment described above, and explanation thereof is omitted.

The distribution server 120 checks whether update data exists, on the basis of the terminal information. When pieces of update data corresponding to the terminals 20 exist, the distribution server 120 transmits the pieces of update data, integrated reference data, and digests of the respective pieces of reference data to the update control apparatus 10 (Step S403). As another example, the distribution server 120 may transmit IDs of the terminals 20 being an update target, update control information, and restoration data and the like to the update control apparatus 10, together with the update data, in the same manner as the first embodiment.

When the update control apparatus 10 receives the pieces of update data, the integrated reference data, and the digests from the distribution server 120, the update control apparatus 10 stores them in the storage area in the in-vehicle network system 100.

After the update control apparatus 10 receives the pieces of update data from the distribution server 120, the update control apparatus 10 changes the state of the automobile equipped with the in-vehicle network system 100 to the "firmware update mode", in the same manner as the first embodiment. The update control apparatus 10 generates update control information, if necessary, and transmits the pieces of update data to the respective terminals 20, to instruct the terminals 20 to update the firmware, on the basis of the update control information (Step S404).

Each of the terminals 20 that received the update data from the update control apparatus 10 updates the firmware stored therein using the update data, and transmits an update result to the update control apparatus 10. At this time, each of the terminals 20 generates, for example, a message authentication code of the updated firmware using a secret key shared in advance with the vendor, and transmits the message authentication code as verification data in addition to the update result, to the update control apparatus 10 (Step S405).

When the update control apparatus 10 receives the update result and verification data from each of the terminals 20, the update control apparatus 10 generates integrated verification data received from pieces of verification data received from the terminals 20, and verifies whether all the update results received from the terminals 20 is proper data, on the basis of whether the generated integrated verification data agrees with the integrated reference data received from the distribution server 120. At this time, in the present embodiment, when it is determined that some of the update results are improper data, the update control apparatus 10 can identify a terminal 20 corresponding to an update result that is improper data, using the pieces of verification data received from the respective terminals 20 and the digests received from the distribution server 120.

Thereafter, the update control apparatus 10 recognizes the states of firmware updates in the respective terminals 20, on the basis of the update results verified as proper data, and transmits the overall update result to the distribution server 120 in accordance with the states (Step S406), or changes the state of the automobile to the "traveling possible mode" or "abnormal mode". These operations are the same as those in the first embodiment, and detailed explanation thereof is omitted.

As described above, the present embodiment has a structure in which the distribution server 120 transmits the integrated reference data to the update control apparatus 10, instead of pieces of reference data or modified reference data for the respective terminals 20. In addition, the update control apparatus 10 generates integrated verification data on the basis of pieces of verification data received from the respective terminals 20, and verifies whether the update results received from the respective terminals 20 are proper data, on the basis of whether the integrated verification data agrees with the integrated reference data. Therefore, the update control apparatus 10 can confirm that the terminals 20 surely updated the firmware thereof, while suppressing the cost for transmitting, storing, and comparing to verify data, even in the situation in which the number of terminals 20 in the automobile increases and pieces of the firmware in the many terminals 20 are updated simultaneously.

Also in the present embodiment, the update control apparatus 10 may include the integrated verification data generated on the basis of the pieces of verification data received from the respective terminals 20 in the overall update result, and transmit the overall update result to the distribution server 120, in the same manner as the modification of the second embodiment described above. In this case, the distribution server 120 can confirm that the terminals 20 have surely updated the firmware thereof and generated the verification data, by confirming that the integrated verification data received from the update control apparatus 10 agrees with the integrated reference data.

Supplementary Explanation

Figure 7:
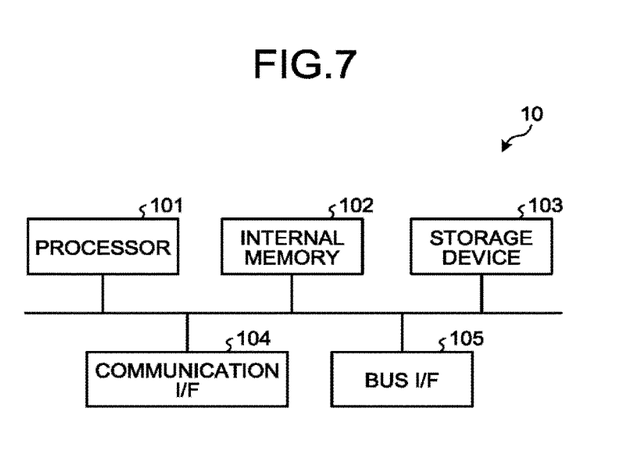
FIG. 7 is a block diagram illustrating a hardware configuration example of the update control apparatus.

The update control apparatus 10 can be achieved using, for example, a hardware configuration of an ordinary computer system. FIG. 7 is a block diagram illustrating a hardware configuration example of the update control apparatus 10 according to the embodiments described above. For example, as illustrated in FIG. 7, the update control apparatus 10 includes a processor (processor circuit) 101, such as a central processing unit (CPU) and a graphics processing unit (GPU), an internal memory 102, such as a random access memory (RAM) and a read only memory (ROM), a storage device 103, such as a hard disk drive (HDD) and a solid state drive (SSD), a communication I/F 104 being a physical interface to connect to the external network 110, and a bus I/F 105 being a physical interface to connect with the network bus 30 of the in-vehicle network system 100.

For example, the functions of the control unit 13 and the verification unit 14 are achieved by executing, with the processor 101, a predetermined control program stored in the storage device 103 and/or the internal memory 102, while using the internal memory 102 as work area. In addition, the function of the vehicle external communication unit 11 is achieved by executing, with the processor 101, the control program to control operations of the communication I/F 104, and the function of the vehicle internal communication unit 12 is achieved by executing, with the processor 101, the control program to control operations of the bus I/F 105.

The control program to achieve the functional constituent elements of the update control apparatus 10 is recorded and provided on, for example, a magnetic disk (such as a flexible disk and a hard disk), an optical disc (such as a CD-ROM, a CD-R, a CD-RW, a DVD-ROM, a DVD±R, a DVD±RW, and a Blu-ray (registered trademark) disc), a semiconductor memory, or a recording medium similar to them. The recording form of the recording medium recording the control program may be any form, as long as the recording medium serves as a computer-readable recording medium. The control program may be configured to be installed in advance in the computer system of the update control apparatus 10, or the control program may be configured to be distributed through a network and properly installed in the computer system.

The update control apparatus 10 in the embodiments described above may have a structure in which part or whole of the functional constituent elements thereof is achieved with dedicated hardware, such as an application specific integrated circuit (ASIC) and a field-programmable gate array (FPGA).

In addition, the update control apparatus 10 according to the embodiments described above is not always configured as a single apparatus, but may be achieved with a plurality of apparatuses (computers) cooperating with each other. Specifically, the functional constituent elements of the update control apparatus 10 described above may be distributed to a plurality of apparatuses (computers). The update control apparatus 10 according to the embodiments described above may be a virtual machine operating on a cloud system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An update control apparatus adapted to control update of software in a terminal connected to a network, the update control apparatus comprising:
a first communication circuit configured to communicate with a server located outside the network;
a second communication circuit configured to communicate with the terminal through the network; and
a processor configured to:
receive update data to update the software from the server using the first communication circuit;
transmit the update data to the terminal using the second communication circuit;
receive an update result indicating whether update of the software has succeeded, together with verification data, from the terminal using the second communication circuit; and
verify, using the verification data, whether the update result is proper data, wherein
the processor is configured to further receive fourth data generated based on the updated software using a secret key shared between a vendor that develops the software and the terminal, or fifth data generated based on the fourth data, from the server, the secret key being not held in the update control apparatus, and receive sixth data from the terminal as the verification data, the sixth data being generated using the secret key based on the software updated by the terminal using the update data, and
the processor is configured to verify whether the update result is proper data based on whether the sixth data received from the terminal agrees with the fourth data received from the server, or whether seventh data generated from the sixth data received from the terminal agrees with the fifth data received from the server.

2. The apparatus according to claim 1, wherein the processor is further configured to retransmit the update data to the terminal using the second communication circuit, or transmit restoration data to the terminal to restore the software before update using the second communication circuit when determining that the update result is not proper data.

3. The apparatus according to claim 1, wherein
the network is an in-vehicle network mounted on an automobile, and
the processor is further configured to control a state of the automobile, in accordance with whether update of the software has succeeded.

4. An update control apparatus adapted to control update of software in a terminal connected to a network, the update control apparatus comprising:
a first communication circuit configured to communicate with a server located outside the network;
a second communication circuit configured to communicate with the terminal through the network; and
a processor configured to:
receive update data to update the software from the server using the first communication circuit;
transmit the update data to the terminal using the second communication circuit;
receive an update result indicating whether update of the software has succeeded, together with verification data, from the terminal using the second communication circuit; and
verify, using the verification data, whether the update result is proper data, wherein
the terminal includes a plurality of terminals,
the verification data includes a plurality of pieces of verification data for respective ones of the plurality of terminals,
the update data includes a plurality of pieces of update data for respective ones of the plurality of terminals, the update result includes a plurality of update results for respective ones of the plurality of terminals, the processor is configured to further receive, from the server, eighth data generated by integrating a plurality of pieces of fourth data generated for respective ones of the plurality of terminals, each piece of the fourth data being generated based on the updated software corresponding to a terminal of the plurality of terminals using a secret key shared between a vendor that develops the software and the terminal, the secret key being not held in the update control apparatus, and receive a plurality of pieces of sixth data from respective ones of the plurality of terminals as the plurality of pieces of verification data of the plurality of terminals, the plurality of pieces of sixth data being generated by the plurality of terminals using the secret key based on the software updated using the plurality of pieces of update data, and the processor is configured to verify whether all the plurality of update results received from the plurality of terminals are proper data, based on whether ninth data generated by integrating the plurality of pieces of sixth data received from the plurality of terminals agrees with the eighth data received from the server.

5. The update control apparatus according to claim 4, wherein
the processor is further configured to:
receive a plurality of pieces of tenth data corresponding to respective ones of the plurality of pieces of fourth data from the server; and
identify an update result that is not proper data among the plurality of update results, using the plurality of pieces of sixth data received from the plurality of terminals and the plurality of pieces of tenth data received from the server, when determining that at least one of the plurality of update results received from the plurality of terminals is not proper data.

6. The apparatus according to claim 4, wherein the processor is further configured to retransmit the update data to the terminal using the second communication circuit, or transmit restoration data to the terminal to restore the software before update using the second communication circuit when determining that the update result is not proper data.

7. The apparatus according to claim 4, wherein
the network is an in-vehicle network mounted on an automobile, and
the processor is further configured to control a state of the automobile, in accordance with whether update of the software has succeeded.

8. A software update system comprising:
a terminal connected to a network; and
an update control apparatus adapted to control update of software in the terminal,
the update control apparatus including:
a first communication circuit configured to communicate with a server located outside the network;
a second communication circuit configured to communicate with the terminal through the network; and
a processor configured to:
receive update data to update the software from the server using the first communication circuit;
transmit the update data to the terminal using the second communication circuit;
receive an update result indicating whether update of the software has succeeded, together with verification data, from the terminal using the second communication circuit; and
verify, using the verification data, whether the update result is proper data, wherein
the processor is configured to further receive fourth data generated based on the updated software using a secret key shared between a vendor that develops the software and the terminal, or fifth data generated based on the fourth data, from the server, the secret key being not held in the update control apparatus, and receive sixth data from the terminal as the verification data, the sixth data being generated using the secret key based on the software updated by the terminal using the update data, and
the processor is configured to verify whether the update result is proper data based on whether the sixth data received from the terminal agrees with the fourth data received from the server, or whether seventh data generated from the sixth data received from the terminal agrees with the fifth data received from the server.

9. An update control method executed in an update control apparatus adapted to control update of software in a terminal connected to a network, the update control method comprising:
receiving update data to update the software from a server located outside the network using a first communication circuit configured to communicate with the server;
transmitting the update data to the terminal using a second communication circuit configured to communicate with the terminal through the network;
receiving an update result indicating whether update of the software has succeeded,
together with verification data, from the terminal using the second communication circuit; and
verifying, using the verification data, whether the update result is proper data, wherein
the receiving of the update data further receives fourth data generated based on the updated software using a secret key shared between a vendor that develops the software and the terminal, or fifth data generated based on the fourth data, from the server, the secret key being not held in the update control apparatus,
the receiving of the update result receives sixth data from the terminal as the verification data, the sixth data being generated using the secret key based on the software updated by the terminal using the update data, and
the verifying verifies whether the update result is proper data based on whether the sixth data received from the terminal agrees with the fourth data received from the server, or whether seventh data generated from the sixth data received from the terminal agrees with the fifth data received from the server.

10. A software update system comprising:
a terminal connected to a network; and
an update control apparatus adapted to control update of software in the terminal,
the update control apparatus including:
a first communication circuit configured to communicate with a server located outside the network;
a second communication circuit configured to communicate with the terminal through the network; and
a processor configured to:
receive update data to update the software from the server using the first communication circuit;
transmit the update data to the terminal using the second communication circuit;

receive an update result indicating whether update of the software has succeeded, together with verification data, from the terminal using the second communication circuit; and verify, using the verification data, whether the update result is proper data, wherein the terminal includes a plurality of terminals, the verification data includes a plurality of pieces of verification data for respective ones of the plurality of terminals, the update data includes a plurality of pieces of update data for respective ones of the plurality of terminals, the update result includes a plurality of update results for respective ones of the plurality of terminals, the processor is configured to further receive, from the server, eighth data generated by integrating a plurality of pieces of fourth data generated for respective ones of the plurality of terminals, each piece of the fourth data being generated based on the updated software corresponding to a terminal of the plurality of terminals using a secret key shared between a vendor that develops the software and the terminal, the secret key being not held in the update control apparatus, and receive a plurality of pieces of sixth data from respective ones of the plurality of terminals as the plurality of pieces of verification data of the plurality of terminals, the plurality of pieces of sixth data being generated by the plurality of terminals using the secret key based on the software updated using the plurality of pieces of update data, and the processor is configured to verify whether all the plurality of update results received from the plurality of terminals are proper data, based on whether ninth data generated by integrating the plurality of pieces of sixth data received from the plurality of terminals agrees with the eighth data received from the server.

11. An update control method executed in an update control apparatus adapted to control update of software in a terminal connected to a network, the update control method comprising:

receiving update data to update the software from a server located outside the network using a first communication circuit configured to communicate with the server;

transmitting the update data to the terminal using a second communication circuit configured to communicate with the terminal through the network;

receiving an update result indicating whether update of the software has succeeded, together with verification data, from the terminal using the second communication circuit; and verifying, using the verification data, whether the update result is proper data, wherein the terminal includes a plurality of terminals, the verification data includes a plurality of pieces of verification data for respective ones of the plurality of terminals, the update data includes a plurality of pieces of update data for respective ones of the plurality of terminals, the update result includes a plurality of update results for respective ones of the plurality of terminals, the receiving of the update data further receives, from the server, eighth data generated by integrating a plurality of pieces of fourth data generated for respective ones of the plurality of terminals, each piece of the fourth data being generated based on the updated software corresponding to a terminal of the plurality of terminals using a secret key shared between a vendor that develops the software and the terminal, the secret key being not held in the update control apparatus, the receiving of the update result receives a plurality of pieces of sixth data from respective ones of the plurality of terminals as the plurality of pieces of verification data of the plurality of terminals, the plurality of pieces of sixth data being generated by the plurality of terminals using the secret key based on the software updated using the plurality of pieces of update data, and the verifying verifies whether all the plurality of update results received from the plurality of terminals are proper data, based on whether ninth data generated by integrating the plurality of pieces of sixth data received from the plurality of terminals agrees with the eighth data received from the server.

* * * * *